(12) United States Patent
Spitzer et al.

(10) Patent No.: US 9,846,607 B2
(45) Date of Patent: Dec. 19, 2017

(54) METHOD AND SYSTEM FOR ASSOCIATING CRASH REPORTS WITH END USER ANALYTICS

(71) Applicant: NVIDIA Corporation, Santa Clara, CA (US)

(72) Inventors: John Spitzer, San Jose, CA (US); Oleg Salyakhov, Moscow (RU)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/645,851

(22) Filed: Mar. 12, 2015

(65) Prior Publication Data

US 2016/0266953 A1    Sep. 15, 2016

(51) Int. Cl.
 *G06F 11/07* (2006.01)
(52) U.S. Cl.
 CPC ........ *G06F 11/079* (2013.01); *G06F 11/0709* (2013.01); *G06F 11/0772* (2013.01); *G06F 11/0778* (2013.01)
(58) Field of Classification Search
 CPC .................................. G06F 11/0778
 USPC ...................................... 714/38.11
 See application file for complete search history.

(56) References Cited

U.S. PATENT DOCUMENTS

| | | | |
|---|---|---|---|
| 5,958,009 A | 9/1999 | Friedrich et al. | |
| 6,059,842 A | 5/2000 | Dumarot et al. | |
| 6,233,531 B1 | 5/2001 | Klassen et al. | |
| 6,513,154 B1* | 1/2003 | Porterfield | G06F 8/20 717/101 |
| 8,296,781 B1 | 10/2012 | Lebaredian et al. | |
| 8,908,987 B1 | 12/2014 | Krishnaswamy et al. | |
| 9,507,887 B1 | 11/2016 | Wang et al. | |
| 2004/0064293 A1 | 4/2004 | Hamilton et al. | |
| 2005/0027858 A1 | 2/2005 | Sloth et al. | |
| 2005/0203952 A1* | 9/2005 | Deily | G06F 17/30902 |
| 2006/0041497 A1 | 2/2006 | Huber | |
| 2006/0265192 A1 | 11/2006 | Turicchi, Jr. | |
| 2007/0061802 A1 | 3/2007 | Tan et al. | |
| 2007/0294673 A1 | 12/2007 | Guerrera et al. | |
| 2008/0021994 A1 | 1/2008 | Grelewicz et al. | |
| 2008/0033696 A1 | 2/2008 | Aguaviva et al. | |
| 2008/0141131 A1 | 6/2008 | Cerny et al. | |
| 2008/0196099 A1* | 8/2008 | Shastri | H04L 12/581 726/12 |

(Continued)

*Primary Examiner* — Chae Ko

(57) ABSTRACT

A method for linking information related to a computer crash. The method includes establishing a network of computing resources communicatively coupled to a network, wherein each computing resource is associated with a corresponding hardware configuration capable of executing and displaying at least one application, wherein each of the network of computing resources is associated with a globally unique identifier (GUID). The method includes receiving configuration information relating to the network of computing resources. The method includes receiving a crash report of a crash occurring on a crashed computing system within the network of computing resources. The method includes extracting a GUID from the crash report, wherein the GUID identifies said crashed computing resource. The method includes determining configuration information for the crashed computing resource, and correlating the configuration information with the crash information.

20 Claims, 6 Drawing Sheets

(56) References Cited

U.S. PATENT DOCUMENTS

| | | | |
|---|---|---|---|
| 2008/0226178 A1 | 9/2008 | Penke et al. | |
| 2008/0235075 A1 | 9/2008 | Couture et al. | |
| 2008/0293499 A1 | 11/2008 | Brewer et al. | |
| 2009/0080408 A1* | 3/2009 | Natoli | G06F 19/322 370/351 |
| 2011/0018884 A1 | 1/2011 | Ritts et al. | |
| 2011/0033050 A1* | 2/2011 | Maller | G06Q 30/02 380/259 |
| 2011/0148899 A1 | 6/2011 | Dumbeck et al. | |
| 2011/0244879 A1 | 10/2011 | Siomina et al. | |
| 2012/0137238 A1 | 5/2012 | Abeln | |
| 2012/0209571 A1 | 8/2012 | Peterson et al. | |
| 2012/0239786 A1 | 9/2012 | Repasi | |
| 2013/0052959 A1 | 2/2013 | Rubin et al. | |
| 2013/0196627 A1* | 8/2013 | Ng | H04W 4/14 455/411 |
| 2013/0304758 A1* | 11/2013 | Gruber | G06F 17/30976 707/769 |
| 2014/0011581 A1 | 1/2014 | Spitzer et al. | |
| 2014/0089525 A1 | 3/2014 | Cardon | |
| 2014/0258139 A1* | 9/2014 | Kawasumi | G06Q 30/016 705/304 |
| 2014/0267439 A1 | 9/2014 | Jenkins | |
| 2014/0359077 A1* | 12/2014 | Chung | H04L 67/06 709/219 |
| 2015/0002681 A1 | 1/2015 | Gong et al. | |
| 2015/0119149 A1 | 4/2015 | Spitzer et al. | |
| 2015/0154934 A1 | 6/2015 | Spitzer et al. | |
| 2015/0161008 A1* | 6/2015 | Antony | G06F 11/1448 714/16 |
| 2015/0186485 A1* | 7/2015 | Guo | G06F 17/30575 707/624 |
| 2015/0331736 A1* | 11/2015 | Kawasumi | G06Q 10/20 714/37 |
| 2016/0078050 A1* | 3/2016 | Dhakar | G06F 17/30348 707/648 |
| 2016/0162838 A1* | 6/2016 | Torkian | G06Q 10/107 709/206 |

* cited by examiner

METHOD AND SYSTEM FOR ASSOCIATING CRASH REPORTS WITH END USER ANALYTICS

BACKGROUND

A computer or system crash includes an event in which a computer or a program encounters a fatal error which the computer or program cannot handle. As such, the computer or program stops operation, or crashes. For example, a program crash includes a software application that crashes. When the program is a critical part of the operating system kernel, then the operating system may crash resulting in a fatal system error.

Crash reporter systems exist today for end users to report application crashes to the engineers responsible for their code (e.g., Microsoft Watson, Google Chromium CrashReporter, etc.). A crash reporter located at a corresponding end user's system is an application configured to report crash details. The crash dump of information included within a crash report typically only includes a stack trace generated at the time of the crash. The stack trace discloses active stack frames existing up to the point of the crash of the application. Information in the stack trace may allow for tracking the sequence of nested functions up to the point where the stack trace was generated.

However, the stack trace, contained in the crash dump associated with the process that crashed, lacks context such as the user's hardware and software configuration (e.g., operation system, drivers, registry settings, etc.). In addition, a crash dump does not include information regarding application usage to provide additional context. As a result, many times the information contained in the crash report is insufficient to determine the cause of the crash.

It is desirable to obtain additional information related to a crash dump to determine the root cause of a crash.

SUMMARY

In embodiments of the present invention, a computer implemented method for linking information related to a computer crash is disclosed. In other embodiments, a non-transitory computer readable medium is disclosed having computer-executable instructions for causing a computer system to perform a method for linking information related to a computer crash. In still other embodiments, a computer system is disclosed comprising a processor and memory coupled to the processor and having stored therein instructions that, if executed by the computer system, cause the computer system to execute a method for linking information related to a computer crash. The method includes establishing a network of computing resources communicatively coupled to a network, wherein each computing resource is associated with a corresponding hardware configuration capable of executing and displaying at least one application, wherein each of the network of computing resources is associated with a globally unique identifier (GUID). The method includes receiving configuration information relating to the network of computing resources. The method includes receiving a crash report of a crash occurring on a crashed computing resource within the network of computing resources. The method includes extracting a GUID from the crash report, wherein the GUID identifies the crashed computing resource. The method includes determining configuration information for the crashed computing resource, and correlating the configuration information with the crash information.

In embodiments of the present invention, another computer implemented method for linking information related to a computer crash is disclosed. In other embodiments, a non-transitory computer readable medium is disclosed having computer-executable instructions for causing a computer system to perform another method for linking information related to a computer crash. In still other embodiments, a computer system is disclosed comprising a processor and memory coupled to the processor and having stored therein instructions that, if executed by the computer system, cause the computer system to execute another method for linking information related to a computer crash. The method includes determining a crash occurring on a computing resource, and gathering crash information related to the crash. The method includes accessing a globally unique identifier (GUID) identifying the crashed computing resource, wherein the GUID is associated with a corresponding user. The method includes appending the GUID to the crash information.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "establishing," "extracting," "receiving," "analyzing," "determining," or the like, refer to actions and processes (e.g., in flowcharts 5 and 6 of the present Application) of a computer system or similar electronic computing device or processor (e.g., computer system 100 and client device 200). The computer system or similar electronic computing device manipulates and transforms data represented as physical (electronic) quantities within the computer system memories, registers or other such information storage, transmission or display devices.

Figure 5:
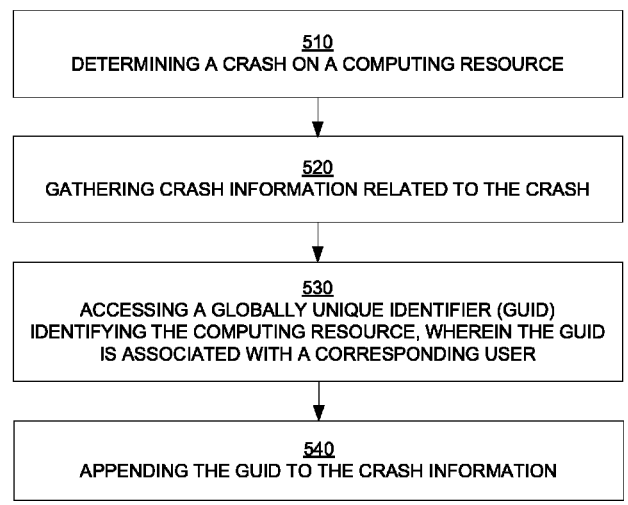
FIG. 5 is a flow diagram illustrating a method for generating a globally unique identifier (GUID) and appending the GUID to a crash report generated for a crash occurring on a computing resource associated with the GUID, in accordance with one embodiment of the present disclosure.
Figure 6:
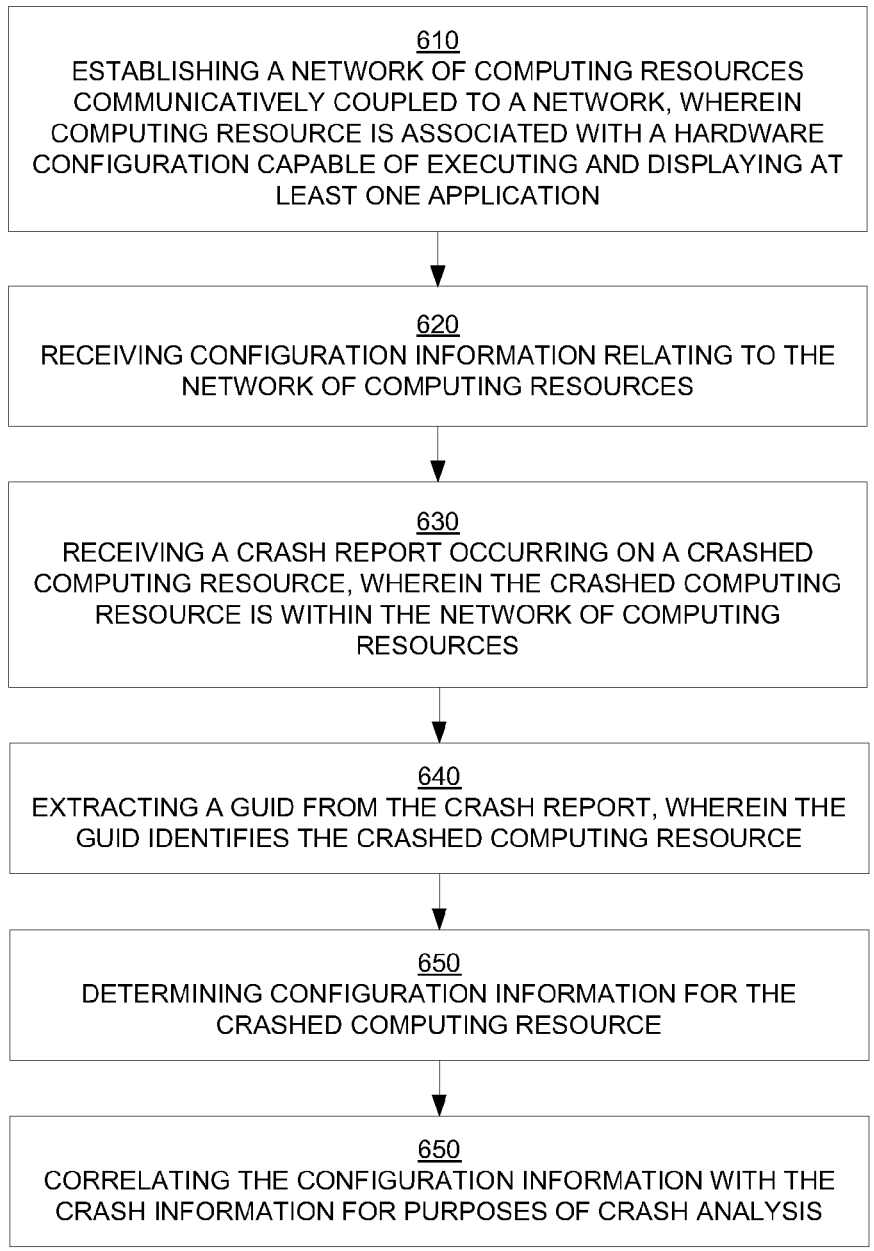
FIG. 6 is a flow diagram illustrating a method for linking crash reports with configuration information related to the crashed computing resources, in accordance with one embodiment of the present disclosure.

FIGS. 5 and 6 are flowcharts of examples of computer-implemented methods for receiving appending identifier information to a crash report associated with a crashed computing resource, and using that identifier information to link that crash report to configuration information of the crashed computing resource, according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
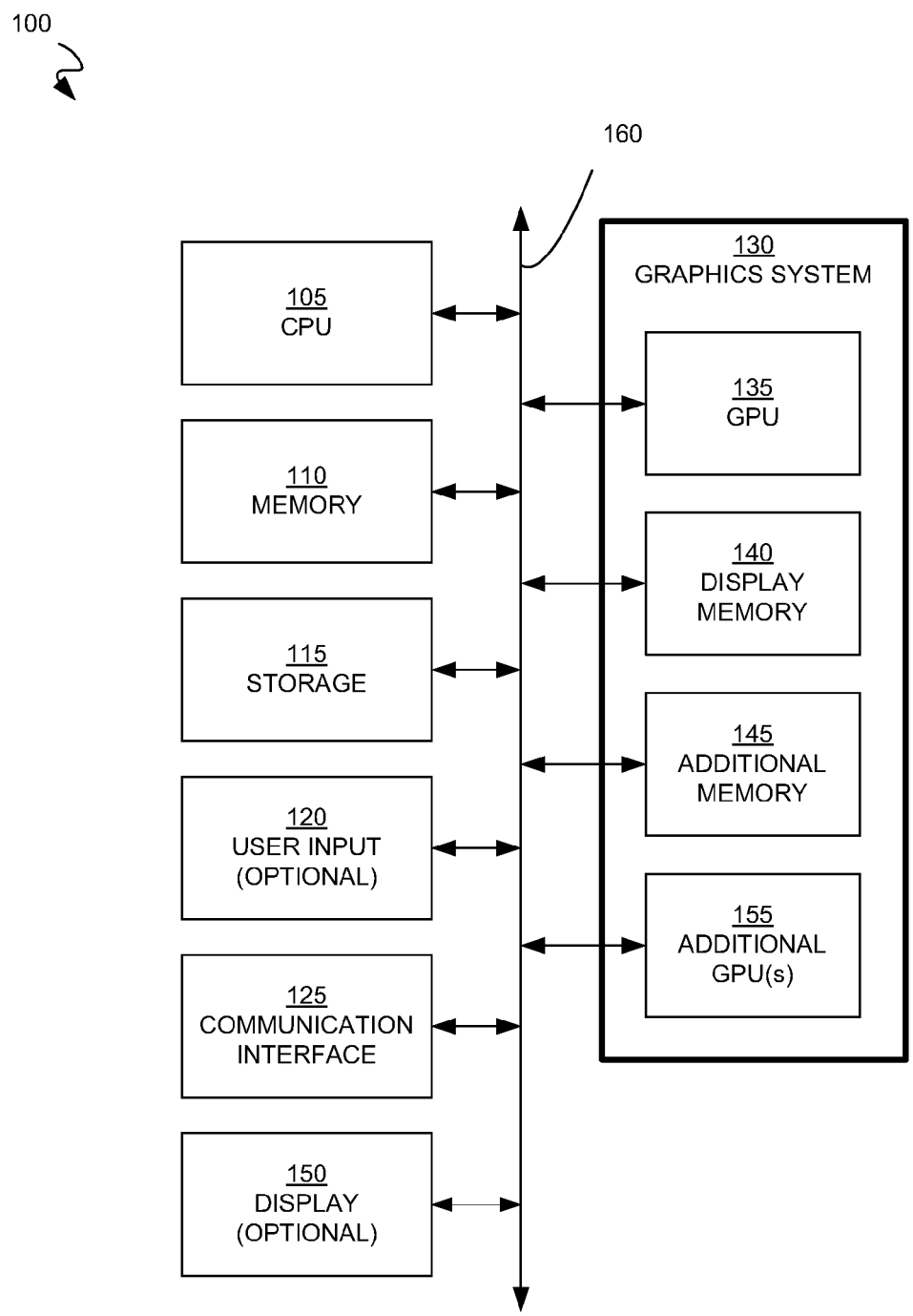
FIG. 1 depicts a block diagram of an exemplary computer system suitable for implementing embodiments according to the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 105 and a system memory 110.

It is appreciated that computer system 100 described herein illustrates an exemplary configuration of an operational platform upon which embodiments may be implemented to advantage. Nevertheless, other computer system with differing configurations can also be used in place of computer system 100 within the scope of the present invention. That is, computer system 100 can include elements other than those described in conjunction with FIG. 1. Moreover, embodiments may be practiced on any system which can be configured to enable it, not just computer systems like computer system 100. It is understood that embodiments can be practiced on many different types of computer systems 100. System 100 can be implemented as, for example, a desktop computer system or server computer system having a power general-purpose CPUs coupled to a dedicated graphics rendering GPU. In such an embodiment, components can be included that add peripheral buses, specialized audio/video components, I/O devices, and the like. Similarly, system 100 can be implemented as a handheld device (e.g., cell phone, etc.) or a set-top video game console device, such as, for example Xbox®, available from Microsoft corporation of Redmond, Wash., or the PlayStation3®, available from Sony Computer Entertainment Corporation of Tokyo, Japan. System 100 can also be implemented as a "system on a chip", where the electronics (e.g., the components 105, 110, 115, 120, 125, 130, 150, and the like) of a computing device are wholly contained within a single integrated circuit die. Examples include a hand-held instrument with a display, a car navigation system, a portable entertainment system, and the like.

In the example of FIG. 1, the computer system 100 includes a central processing unit (CPU) 105 for running software applications and optionally an operating system.

Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including the internet. The optional display device 150 may be any device capable of displaying visual information in response to a signal from the computer system 100. The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands. The physical GPU 135 can be configured as multiple virtual GPUs that may be used in parallel (concurrently) by a number of applications executing in parallel.

Graphics memory may include a display memory 140 (e.g., a frame buffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
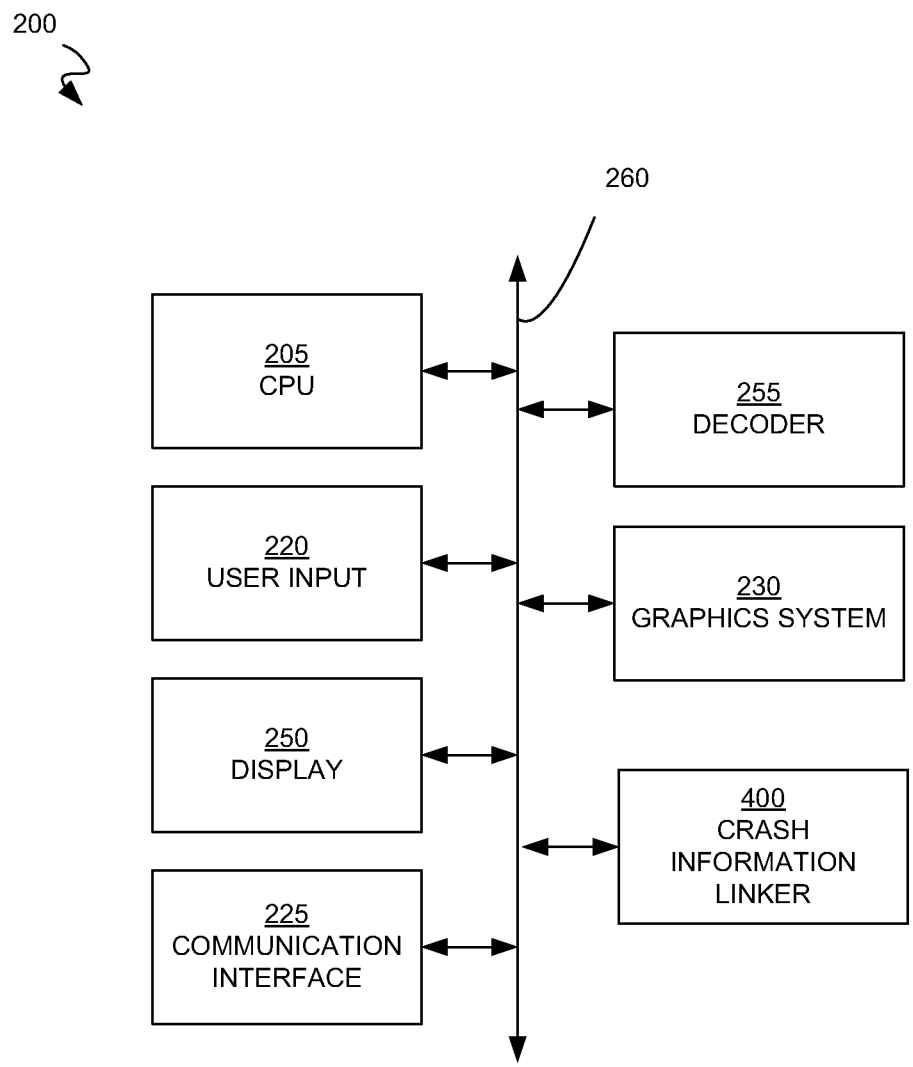
FIG. 2 is a block diagram of an example of a client device capable of implementing embodiments according to the present disclosure.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones.

The communication interface 225 allows the client device 200 to communicate with other computer systems (e.g., the computer system 100 of FIG. 1) via an electronic communications network, including wired and/or wireless communication and including the internet. The decoder 255 may be any device capable of decoding (decompressing) data that may be encoded (compressed). For example, the decoder 255 may be an H.264 decoder. The display device 250 may be any device capable of displaying visual information, including information received from the decoder 255. The display device 250 may be used to display visual information generated at least in part by the client device 200. However, the display device 250 may be used to display visual information received from the computer system 100. The components of the client device 200 may be coupled via one or more data buses 260. Further, the components may or may not be physically included inside the housing of the client device 200. For example, the display 250 may be a monitor that the client device 200 communicates with either through cable or wirelessly.

Relative to the computer system 100, the client device 200 in the example of FIG. 2 may have fewer components and less functionality and, as such, may be referred to as a thin client. However, the client device 200 may include other components including all those described above with regard to the computer system 100, for example, graphics system 230 that may be similar to graphics system 130 of FIG. 1. In general, the client device 200 may be any type of device that has display capability, the capability to decode (decompress) data, and the capability to receive inputs from a user and send such inputs to the computer system 100. However, the client device 200 may have additional capabilities beyond those just mentioned. The client device 200 may be, for example, a personal computer, a tablet computer, a television, a hand-held gaming system, or the like.

In addition, the computer system 100 includes a crash information linker 400 that is configured for lining crash report information related to a crashed computing resource with information (configuration) of the crashed computing system collected by a third party for purposes of crash analysis, in accordance with embodiments of the present disclosure. The crash information linker 400 is described in more detail in relation to FIG. 4.

Throughout this application, the term "gaming application" is used for illustration only, and embodiments of the present invention can be applied to any type of application. In one embodiment, an application is a video game application; however, the invention is not so limited. That is, the application can be any type of application. For example, the application may provide financial services, computer aided design (CAD) services, etc. In still another example, the application may be a programming guide that provides, in table form, a list of the various programs that are available on different television channels in different time slots, and the client device may be a set top box (cable or satellite).

Figure 3:
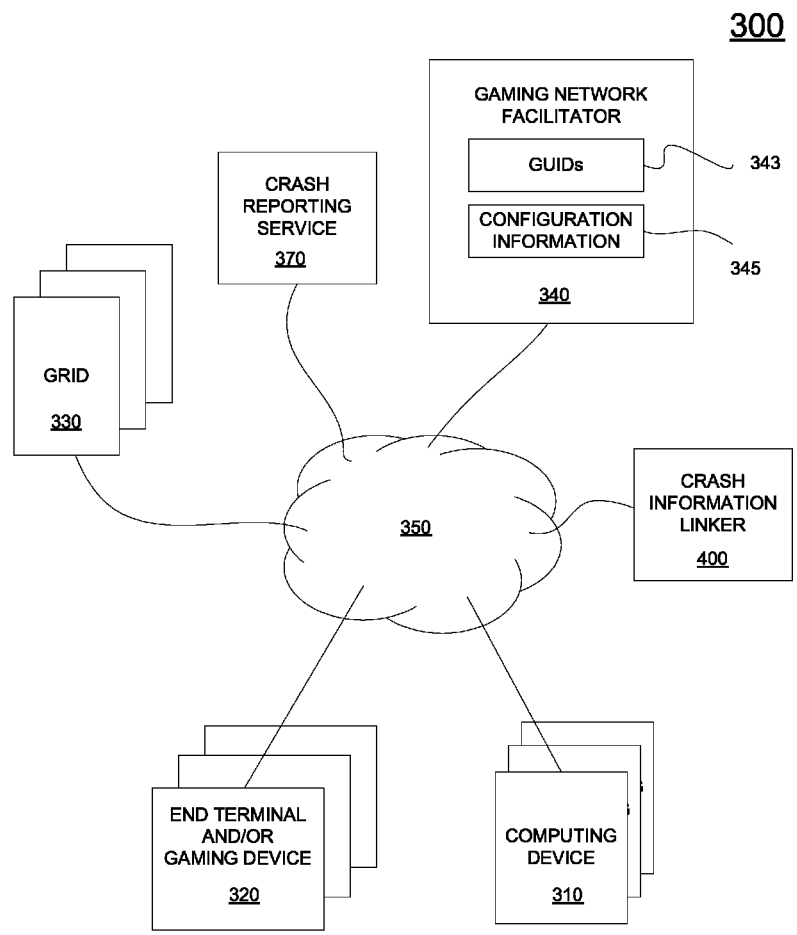
FIG. 3 is a block diagram of an example of a network architecture including a crash information linker capable of linking crash reports with configuration information related to the crashed computing resources, in accordance with one embodiment of the present disclosure.

FIG. 3 is a block diagram of an example of a network architecture 300 in which a plurality of computing devices 310 is coupled through a communication network 350 to a back-end gaming network facilitator 340 providing various services that are designed to give end-users the best experience when executing associated applications, in accordance with one embodiment of the present disclosure. Network 350 generally represents any telecommunication or computer network including, for example, an intranet, a wide area network (WAN), a local area network (LAN), a personal area network (PAN), or the internet. Each of the plurality of computing devices may be any device capable of executing a gaming application, such as, a personal computer, a tablet computer, a hand held gaming device, a portable computing device, etc.

In one specific implementation, the gaming network facilitator 340 is configured to provide the best gaming experience to end users when executing gaming applications. For example, the gaming network facilitator 340 is configured to provide a social network for the end users, customized gaming applications to the end users who are members of the network, recommended settings for computing systems when executing a corresponding application, and other services enhancing the gaming experience.

In one embodiment, the end user's computing resource is configured as an end terminal and/or gaming device 320 used for displaying video in combination with a GRID system 330 that provides computing and graphics processing at a back-end server. In particular, the GRID system 330 provides cloud based virtualized computing and graphics processing for remote displays. For example, the GRID system 330 may include a number of virtual computing processing units (CPUs) and graphics processing units (GPUs) that in combination support one or more gaming applications. In one case, the end terminal and/or gaming device 320 is coupled to a virtual CPU and GPU combination at the GRID system 330 through the network 350.

In one embodiment, GRID system 330 provides network resources managed by one or more host operating systems, wherein the network resources (e.g., CPU, GPU, etc.) are virtualized and shared within one or more virtual machines (VMs) and external communication networks. That is, one or more host systems manage a plurality of physical servers that support a plurality of virtual machines. In particular, the host manager in conjunction with other elements (e.g., hypervisor) creates, manages, and runs a plurality of virtual machines. In one implementation, the GRID system 330 may include a distributed network of computing resources made available through a communication network. In that manner, the GRID system 330 provides complete, virtualized gaming systems that are also designed to provide high power graphics processing that are accessed through end terminals and/or gaming devices (e.g., device 320). As such, a user may load a gaming application using a virtualized CPU and/or GPU supported at the GRID system 330, wherein the virtual CPU and/or GPU combination is associated with a particular hardware and/or software configuration.

In another embodiment, the gaming device 320 is a stand-alone device that is configured for executing and controlling the actions within a gaming application. In one implementation, the gaming device 320 comprises a handheld gaming console. For instance, the gaming device 320 includes a processor for executing an internally stored gaming application. The gaming device 320 also includes a display (e.g., a high-definition display) for the display of various images, including video from a locally executing gaming application, video from a remotely executing gaming application, secondary or supplemental video of a gaming application related to a gaming application, etc. In one embodiment, the gaming device 320 is communicatively coupled (e.g., directly or indirectly through a WAN, LAN, Wi-Fi, etc.) to various secondary, local devices, such as, those within a short distance of each other, like in a home environment. For example, gaming device 320 may act as a display for a personal computer or mobile device that are executing a gaming application, or an TV monitor (e.g., high-definition television) for displaying video from a gaming application executed on the gaming device 320. In another embodiment, the gaming device 320 is communicatively coupled (e.g., through WAN, LAN, internet, etc.) to remote devices, such as, remote web servers, the OPS server 340, GRID servers 330. In addition, the gaming device 320 may be coupled a mobile based application store that is affiliated with an entity supporting a gaming environment and/or community accessible through the handheld gaming device 320, such as, TegraZone associated with Nvidia Corp. that manages a suite of Google Android based gaming applications suitable for execution on the gaming device 320.

In one embodiment, the gaming network facilitator 340 is configured to provide a globally unique identifier (GUID) 343 to each of the members of the gaming network using the communication network 350. The identifier is globally unique in the sense that within the network, one computing resource is uniquely identified, in one embodiment. In other embodiments, the GUID is more broadly unique across one or more networks.

In addition, communication is made between the computing resources of the members and the gaming network facilitator 340 through communication network 350. In that manner, information 345 related to the computing resources may be communicated back to the gaming network facilitator 340. For example, the configuration (hardware and software) and usage data of a particular computing resource associated with a corresponding GUID 343 is communicated and stored back at the gaming network facilitator 340. As an illustration, information 345 that is collected may include the operating system, drivers, registry settings, applications installed and executed, etc.

Network architecture includes a crash reporting service 370 that is configured to receive crash reports from individual computing systems within which one or more applications have crashed, or has undergone a system-wide crash. The crash reports include a dump of crash data related to the crash, such as stack traces, type of crash, and version of software of the application that has crashed. In particular, the stack trace includes stack frames of a call stack that is associated with a program or application that is executing on the computing resource. The stack frames include information about the active subroutines (e.g., state information) of the corresponding application, as is well known in the art. In addition, when the computing resource is a member of the gaming network facilitator 340, the GUID is also included in the crash dump of information. The crash reporting service 370 reports the collected information to relevant parties, such as software developers, including the developers of applications that have crashed, etc.

Network architecture 300 includes a crash information linker 400 that is configured to link information received through the gaming network facilitator 340 and the crash dump information reported by the crash reporting service 370. In that manner, for a computing resource that has experienced and reported a crash, additional information including configuration and usage information 345 associated with the crashed computing resource may be correlated with and added to the wealth of information collected during the corresponding crash dump collected by the crashed computing resource and delivered to the crash reporting service 370, as will be further described below in relation to FIGS. 5 and 6. Furthermore, for a plurality of computing resources that have reported and experienced the same or similar crashes of the system and/or program(s), configuration and usage information associated with all of the computing resources may be correlated with and added to the information reported to the crash reporting service 370, which is collected and/or analyzed by the crash information linker 400 to discover the shared root causes or some commonality of the reported crashes.

Figure 4:
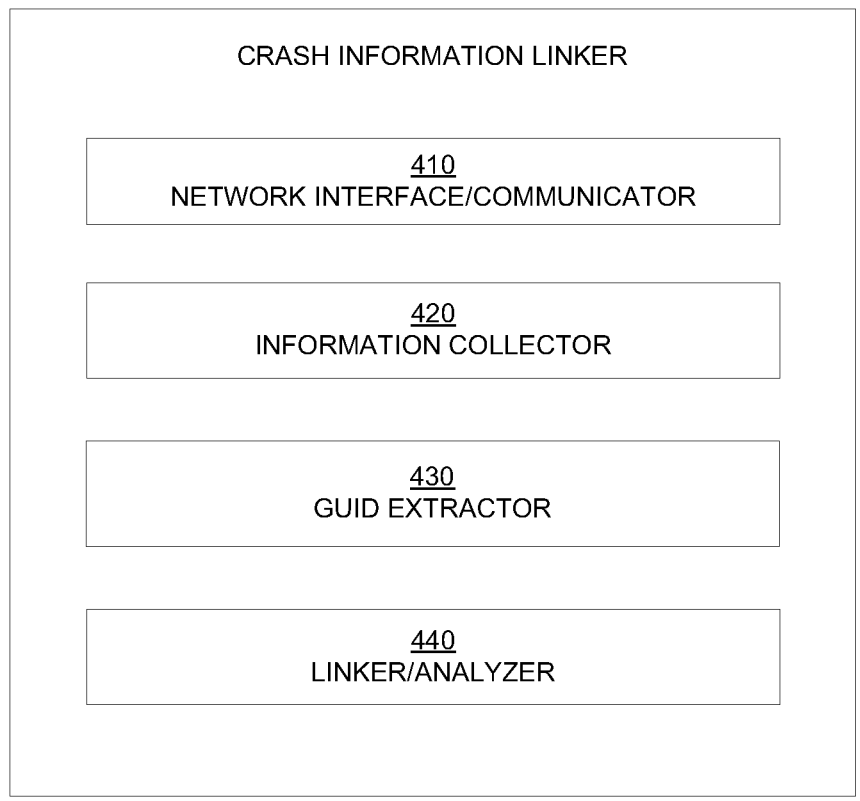
FIG. 4 is a block diagram of a crash information linker that is configured to link crash reports with configuration information related to the crashed computing resources, in accordance with one embodiment of the present disclosure.

FIG. 4 is a block diagram of a crash information linker 400 that is configured to link crash reports with configuration information related to the crashed computing resources, in accordance with one embodiment of the present disclosure. In particular, the crash information linker 400 is configured for linking information collected from one or more sources for purposes of crash analysis. That is, crash dump information, including stack traces for computing resources reporting crashes, is linked to contextual information about those crashed computing resources that are collected by other parties, such as the gaming network facilitator 340. The contextual information includes an end-user's hardware and software configuration (e.g., operating system, drivers, registry settings, etc.), and application usage. Module 400 is implementable within either of the computing systems 100 and 200 of FIGS. 1 and 2, in accordance with embodiments of the present invention.

The crash information linker 400 includes an interface 410 configured to provide communication back to a third party, such as the gaming network facilitator 340 or crash reporting service 370 for purposes of crash analysis. For instance, interface 410 comprises a network interface or communicator. In that manner, crash dump information is delivered to the linker 400 through interface 410 and centrally collected by the information collector 420. In one embodiment, GUID information is also collected in relation to the crash dump information. In addition, configuration and usage information related to the operating context of each of the crashed computing resources is also delivered to the crash information linker 400 through interface 410 and collected by information collector 420.

The crash information linker 400 includes GUID extractor 430, which is configured to extract GUID information from all the crash information collected by the information collector 420. Specifically, for each individual crash report that is reported by a computing resource that is associated with or a member of the network operated by the gaming network facilitator 340, a corresponding GUID is appended to the crash information. The GUID may be prepended with a tag or universal identifier that identifies the tagged information as being a GUID. The tag helps the extractor 430 to parse through the wealth of crash dump information and extract the one or more GUIDs. In addition, a link between the relevant crash dump information and/or relevant metadata is generated linking the GUID and the crash dump information by the crash information linker 400 for purposes of crash analysis.

In particular, crash information linker 400 includes linker/analyzer 440 that is configured to link the crash dump information including GUIDs and the configuration and usage information. For example, a link back to corresponding crash dump information is added to the relevant configuration and usage information stored in one or more databases. In that manner, relevant crash dump information and/or metadata is linked to configuration and usage information of one or more computing resources reporting similar crashes.

The association between the linked information is provided through the GUID. That is, for a particular crash report, a corresponding GUID is included that points to the computing resource reporting the crash. The GUID is also associated with configuration and program usage information that is stored by a separate third party, such as the gaming network facilitator 340.

In that manner, linked information related to a plurality of GUIDs, a plurality of crash reports, and a plurality of configuration and usage information related to the GUIDs is collected for purposes of crash analysis. For example, the linker/analyzer 440 is configured to analyze the collection of information to determine commonality and shared root-causes of the one or more crashes.

FIG. 5 is a flow diagram illustrating a method for linking crash report information and computing resource contextual information for purposes of crash analysis, in accordance with one embodiment of the invention. In still another embodiment, flow diagram 500 illustrates a computer implemented method for linking crash report information and computing resource contextual information for purposes of crash analysis. In another embodiment, flow diagram 500 is implemented within a computer system including a processor and memory coupled to the processor and having stored therein instructions that, if executed by the computer system causes the system to execute a method for linking crash report information and computing resource contextual information for purposes of crash analysis. In still another embodiment, instructions for performing a method as outlined in flow diagram 500 are stored on a non-transitory computer-readable storage medium having computer-executable instructions for linking crash report information and computing resource contextual information for purposes of crash analysis. The method outlined in flow diagram 500 is implementable by one or more components of the computer system 100 and client device 200 of FIGS. 1 and 2, respectively. In one implementation, the operations performed in diagram 500 are performed locally at the computing resource experiencing a crash. In another implementation, the operations performed in diagram 500 are performed remotely.

At 510, the method includes determining a crash on a computing resource, hereinafter referred to as a crashed computing resource. For example, the crash includes a system crash wherein the entire computing system crashes (e.g., operating system crash), or a program crash, wherein one program ceases to operate (e.g., fails to execute an instruction).

At 520, the method includes gathering crash information related to the crash. For instance, a crash reporter local to the crashed computing resource is configured to collect relevant information related to the crash, such as, stack traces, type of crash, etc.

Additionally, at 530, the method includes accessing a GUID that identifies the crashed computing resource. The GUID is located locally within the crashed computing resource. For instance, the GUID is stored in a predefined location (e.g., registry, through an API call, a file, etc.). The GUID is used for identifying the crashed computing resource for one or more purposes and/or entities. In one implementation, the GUID is generated and received by a third party, such as, a gaming social network. That is, the GUID is used to identify the crashed computing resource as a member of the gaming network that is established to provide the best gaming experience for its members. In this case, the GUID may also identify a corresponding user that is associated with the crashed computing resource. In addition, the GUID is used for crash analysis, according to embodiments of the present invention.

At 540, the method includes appending the GUID to the crash information. For instance, the GUID is appended as a local variable on the stack trace. In one implementation, the GUID is appended in the stack trace before the crash occurs. In another implementation, the GUID is appended in the stack trace after the crash occurs.

In one embodiment, a second identifier is appended to the GUID. The second identifier is common amongst all assigned GUIDs. In that manner, similar GUIDs that are included within crash reports are searchable through scanning. That is, any crash report including GUIDs that are similarly identified through a common tag (the second identifier) is readily parsed from the pile of crash reports. These crash reports may be further correlated with information accessed through the corresponding GUID (e.g., configuration and usage data).

The information gathered in response to the crash is reported to a third party, such as, a centralized crash reporter. In one case, the centralized crash reporter includes a software developer, such as an operating system developer (e.g., Microsoft), or a search engine developer (e.g., Google, etc.). The centralized crash reporter passes along the crash reports to relevant parties. For example, the crash report may be delivered to the owner of all applications executing on the crashed computing system. The crash report may also be delivered to the CPU or GPU designer, whether or not the crash is related to those elements.

FIG. 6 is a flow diagram illustrating a method for linking crash reports with configuration information related to the crashed computing resources for purposes of crash analysis, in accordance with one embodiment of the present disclosure. In still another embodiment, flow diagram 600 illustrates a computer implemented method for linking crash reports with configuration information related to the crashed computing resources for purposes of crash analysis. In another embodiment, flow diagram 600 is implemented within a computer system including a processor and memory coupled to the processor and having stored therein instructions that, if executed by the computer system causes the system to execute a method for linking crash reports with configuration information related to the crashed computing resources for purposes of crash analysis. In still another embodiment, instructions for performing a method as outlined in flow diagram 600 are stored on a non-transitory computer-readable storage medium having computer-executable instructions for linking crash reports with configuration information related to the crashed computing resources for purposes of crash analysis. The method outlined in flow diagram 600 is implementable by one or more components of the computer system 100 and client device 200 of FIGS. 1 and 2, respectively.

At 610, the method includes establishing a network of computing resources communicatively coupled to a network, wherein each computing resource is associated with a corresponding configuration of hardware and software that is capable of executing and displaying at least one application. Additionally, each of the computing resource in the network is associated with a globally unique identifier (GUID). That is, a GUID is assigned to each of the computing resources, and delivered to and stored at each corresponding computing resource.

At 620, the method includes receiving configuration information relating to the network of computing resources. That is, each computing resource in the network is configured to send back information related to its operation. For instance, for a particular computing resource, that information provides an operational context at a particular point in time. As such, the information may include configuration information (e.g., hardware and/or software operational settings). In addition, the information may include application usage information. That is, the information provides details as to which applications are executing at a particular point in time. In one embodiment, configuration and usage information is related to and associated with a corresponding GUID. That is, a GUID references a specific computing resource, of which configuration and application usage information is also centrally collected and stored.

For example, in one implementation, the network of computing resources is associated with a plurality of end users supported by a back-end server of a third party. As such, end user information may be passed from the network of computing resources back to the third party, such as, configuration information, application information, etc. The third party is configured to provide the best gaming experience for each of the end users. That is, the third party provides access to information, games, and services that maximize the experience of the end users when playing and/or executing a gaming application. The collected information is used to further optimize the user's gaming experience, and in one embodiment, to provide additional information for purposes of crash analysis.

At 630, the method includes receiving a crash report of a crash that is occurring on a crashed computing resource, wherein the crashed computing resource is capable of being found within the network of computing resources. For example, the crash report is delivered from a third party crash reporter that receives and collects crash reports delivered from the crashed computing resource. Information included within the crash reports includes stack traces for the one or more processes that crashed.

At 640, the method includes extracting a GUID from the crash report. The GUID identifies the crashed computing resource that is within the network of computing resources. For example, in one implementation the GUID includes a universal member identifier that identifies all related GUIDs. For example, the universal identifier includes a tag that identifies each GUID that is associated with or identifies a member of a network (e.g., the network of computing resources). As such, the crash report is searched for the universal identifier or tag. Once found, the associated GUID is known. In that manner, the GUID is associated with the crash report, and the information contained therein.

At 650, the method includes determining configuration information for the crashed computing resource. Since the GUID associated with the crash report is known, the computing resource reporting the crash report is also known. As such, the GUID is used to cross-reference additional information associated with that known computing resource, wherein the additional information is collected by other third party resources, such as, a gaming social network proving a gaming experience to its members. For example, the GUID may be associated with and generated by a gaming social network, which also provides analysis for crashes reported by its members, as described in embodiments of the present invention. As such, information collected by the gaming social network related to the computing resource used for accessing services is stored, referenced, and accessed using the corresponding GUID.

At 660, the method includes correlating the configuration information with the crash information. That is, the GUID is able to provide a linking relationship between crash dump information and the contextual information associated with computing resources reporting crashes. For example, GUIDs are included within each crash report provided by computing resources associated with the network. In addition, the GUIDs are used within the network to provide contextual information, such as, configuration and application usage information. Though the information is collected separately, GUIDs found in crash reports may be linked with corresponding contextual information. As a result, the combined set of information including crash report information as well as contextual information (e.g., configuration and application usage information) is used for crash analysis. In one case, similar or the same crash report are analyzed using the combined set of information to determine commonality and shared root causes to the crashes.

In one implementation, the correlation is materialized by providing a physical or searchable link between the two sets of information. For instance, for a particular crash report associated with a GUID, a link to the crash report and/or relevant metadata is provided within the database storing contextual information (e.g., configuration and application usage information) related to the computing resource identified by the same GUID.

In addition, a plurality of crash reports and the information relating to those crash reports may be combined with corresponding configuration and application usage information for the plurality of computing resources reporting crashes to expand the pool of information used to perform crash analysis. For example, the method includes receiving a plurality of similar crash reports comprising a plurality of GUIDs. Configuration information relating to computing resources associated with the plurality of GUIDs can then be determined, using a third party collecting and storing information in relation to those GUIDs. As a result, information contained within the crash reports can be correlated with contextual information related to the collected and determined GUIDs, to include contextual information, such as configuration and application usage information. The combined information including the plurality of configuration information and crash information of said plurality of crash reports is analyzed to determine a root cause of a plurality of crashes associated with the plurality of similar crash reports.

Thus, according to embodiments of the present disclosure, systems and methods are described providing for collecting and linking crash reports with configuration information related to a crashed computing resources for purposes of crash analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in that many architectural variants can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for linking information, comprising;
determining a crash on a computing resource;
gathering crash information related to said crash, the crash information being comprised in a crash report;
extracting a globally unique identifier (GUID) from the crash information, the GUID identifying the computing resource and comprising usage data of one or more applications executing in the computing resource;
accessing the crash report from a database communicatively coupled to the crashed computing resource and comprising a storage of a plurality of GUIDs;
identifying a plurality of computing resources corresponding to the crashed computing resource,
wherein the GUID is pre-pended with a tag identifying the GUID as one of the plurality of GUIDs,
further wherein, extracting the GUID comprises parsing the crash report for the tag.

2. The method of claim 1, wherein extracting the GUID further comprises:
reporting the crash information to a third party affiliated with the database.

3. The method of claim 1, wherein the crash information comprises a stack trace.

4. The method of claim 1, wherein the computing resource is communicatively coupled to a back-end network facilitator, further wherein the GUID is assigned to the computing resource by the back-end network facilitator.

5. The method of claim 1, further comprising:
storing said GUID locally as a variable within a stack trace.

6. The method of claim 1, wherein the computing resource is configured to receive computing and graphics processing performed in a back-end server of a GRID system.

7. The method of claim 6, wherein the GRID system provides cloud-based virtualized computing and graphics processing for the computing resource.

8. A method for linking information, comprising:
receiving a crash report of a crash occurring on a computing resource within a network of computing resources;
extracting a GUID from said crash report, wherein said GUID identifies the computing resource and comprises configuration information corresponding to the computing resource;
accessing the crash report from a database communicatively coupled to the crashed computing resource and comprising a storage of a plurality of GUIDs identifying a plurality of computing resources corresponding to the crashed computing resource,
wherein the GUID is pre-pended with a tag identifying the GUID as one of the plurality of GUIDs,
further wherein, extracting the GUID comprises parsing the crash report for the tag.

9. The method of claim 8, wherein said configuration information comprises information associated with one or more applications executing in the computing resource.

10. The method of claim 8, wherein said configuration information comprises hardware and software configuration operational settings corresponding to the computing resource.

11. The method of claim 8, wherein the computing resource is communicatively coupled to a back-end network facilitator, further wherein the GUID is assigned to the computing resource by the back-end network facilitator.

12. The method of claim 8, wherein the computing resource is configured to receive computing and graphics processing performed in a back-end server of a GRID system.

13. The method of claim 12, wherein the GRID system provides cloud-based virtualized computing and graphics processing for the computing resource.

14. The method of claim 8, further comprising:
receiving a plurality of similar crash reports comprising a plurality of GUIDs;
determining a plurality of configuration information used with a plurality of computing resources associated with said plurality of GUIDs; and
correlating said plurality of configuration information with crash information in the plurality of similar crash reports.

15. The method of claim 14, further comprising:
analyzing the plurality of configuration information and crash information of the plurality of crash reports to determine a root cause of a plurality of crashes associated with the plurality of similar crash reports.

16. A non-transitory computer-readable medium having computer executable instructions for causing a computer system to perform a method for updating optimal settings, the instructions comprising:
instructions to determine a crash on a computing resource;
instructions to gather crash information related to said crash, the crash information being comprised in a crash report;
instructions to extract a globally unique identifier (GUID) from the crash information, the GUID identifying the computing resource and comprising usage data of one or more applications executing in the computing resource;
instructions to access the crash report from a database communicatively coupled to the crashed computing resource and comprising a storage of a plurality of GUIDs identifying a plurality of computing resources corresponding to the crashed computing resource,
wherein the GUID is pre-pended with a tag identifying the GUID as one of the plurality of GUIDs,
further wherein, the instructions to extract the GUID comprises instructions to parse the crash report for the tag.

17. The computer-readable medium of claim 16, wherein the instructions to access the crash report comprises:
linking said instructions to provide a link to the crash information within said configuration information.

18. The computer-readable medium of claim 16, wherein the computing resource is communicatively coupled to a back-end network facilitator, further wherein the GUID is assigned to the computing resource by the back-end network facilitator.

19. The computer-readable medium of claim 16, wherein the computing resource is configured to receive computing and graphics processing performed in a back-end server of a GRID system.

20. The computer-readable medium of claim 16, wherein the GRID system provides cloud-based virtualized computing and graphics processing for the computing resource.

* * * * *